Figure 5:
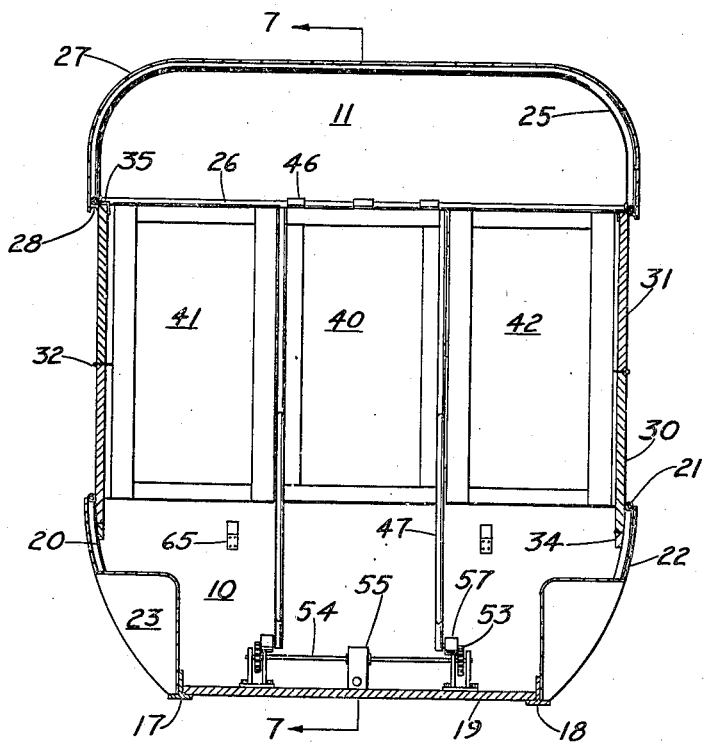

Sept. 27, 1949.　　　H. C. BRUMBAUGH　　　2,483,332
COLLAPSIBLE TRAILER VEHICLE
Filed April 15, 1946　　　　　　　　　　3 Sheets-Sheet 1
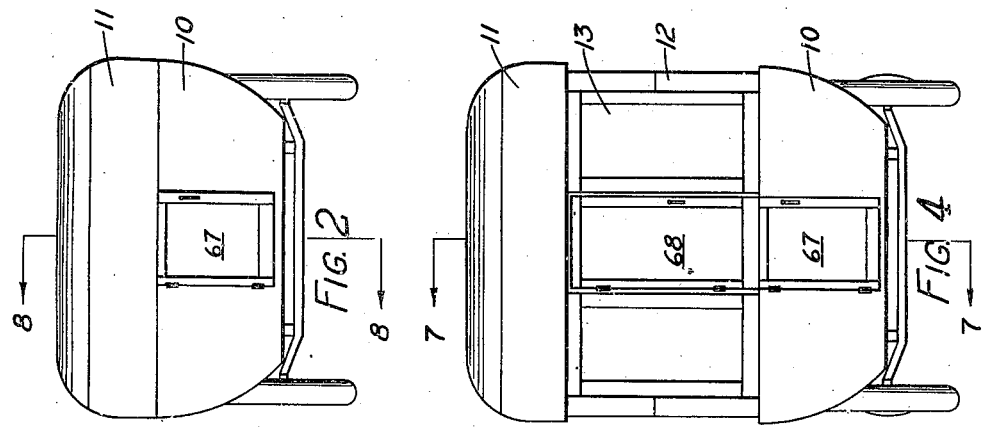
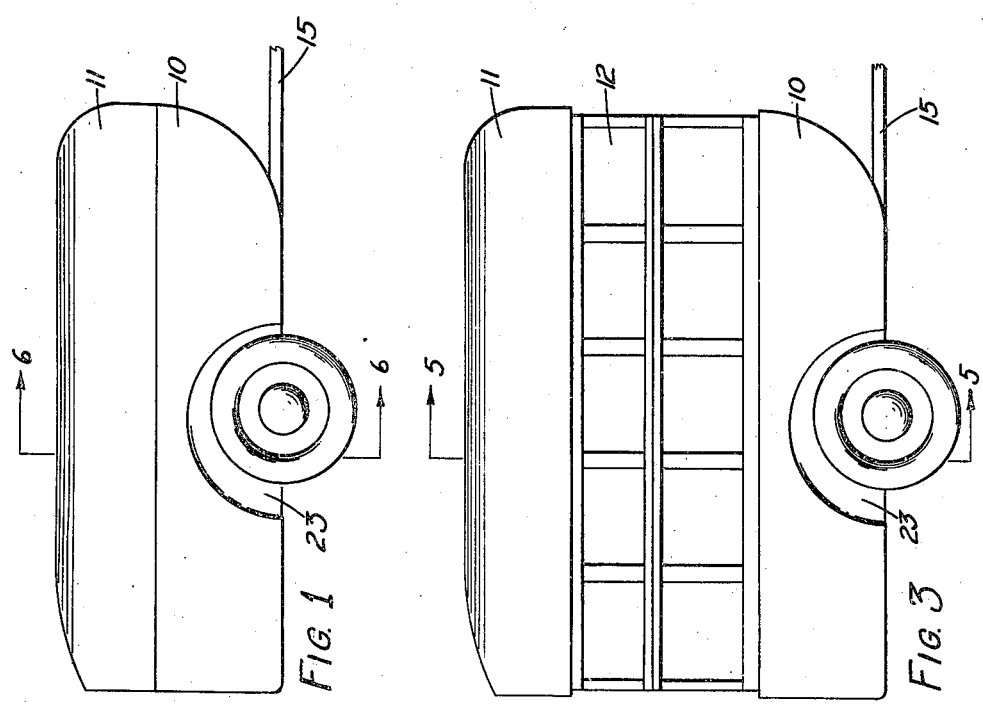
INVENTOR
HAROLD C. BRUMBAUGH
BY
ATTORNEY Sept. 27, 1949.    H. C. BRUMBAUGH    2,483,332
COLLAPSIBLE TRAILER VEHICLE
Filed April 15, 1946    3 Sheets-Sheet 3

INVENTOR
HAROLD C. BRUMBAUGH
BY
ATTORNEY

Patented Sept. 27, 1949

2,483,332

UNITED STATES PATENT OFFICE 2,483,332

COLLAPSIBLE TRAILER VEHICLE

Harold C. Brumbaugh, Portland, Oreg.

Application April 15, 1946, Serial No. 662,284

5 Claims. (Cl. 296—23)

1

The present invention relates to trailer vehicles of the folding or collapsible type. While the invention is not necessarily limited thereto it is particularly adaptable to house trailers.

Collapsible house trailers have been provided heretofore but they have generally been of a flimsy construction, usually having canvas walls and top providing unsatisfactory shelter. Furthermore, they have been relatively difficult to set up and take down, particularly for a single person.

It is an object of the present invention to provide a new and improved trailer vehicle provided with collapsible side and end walls whereby the vehicle may be reduced to a relatively small compact size and with a low center of gravity for towing.

A further object of the invention is to provide a new and improved housing trailer having hinged, rigid panel side walls and end walls which may be folded inwardly to permit lowering of the roof relative to the base section as for towing, the side and end walls when in the upright position forming a rigid weatherproof enclosure of maximum height.

A still further object of the invention is to provide a new and improved house trailer having inwardly folding panel side walls and end walls together with manual operating means whereby the raising and collapsing operations may be performed quickly and easily by a single person.

A further object of the invention is to provide a new and improved lightweight house trailer and which is capable of inexpensive manufacture.

In accordance with the illustrated embodiment, the trailer vehicle of the present invention comprises cooperating boxlike base and roof sections having panel side wall sections higedly mounted to the upper and lower edge portions of the base and roof sections respectively, the side wall sections being further hinged intermediate their upper and lower edges parallel with the base and roof sections permitting inward folding movement thereof. The panel end wall sections are hingedly mounted at their upper ends to the roof section and are connected at their lower ends to an operating mechanism provided in the base section whereby raising and lowering movements of the roof section may be effected.

Additional objects and advantages of the invention will become apparent from the following description taken in connection with the accompanying drawings while the features of novelty will be pointed out with greater particularity in the appended claims.

Figure 6:
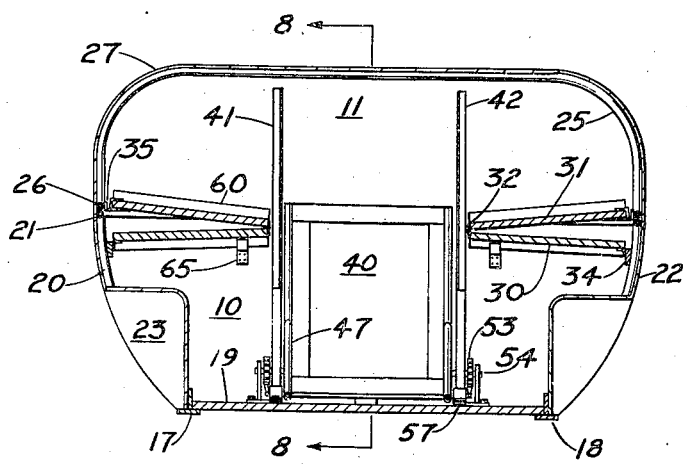
Figure 7:
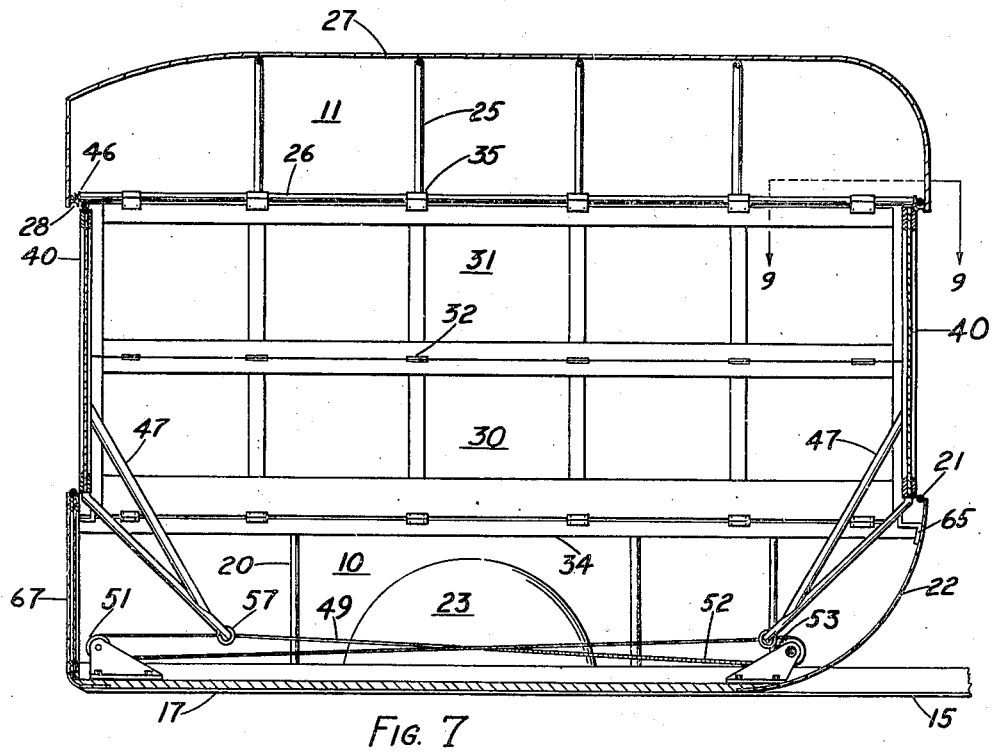
Figure 8:
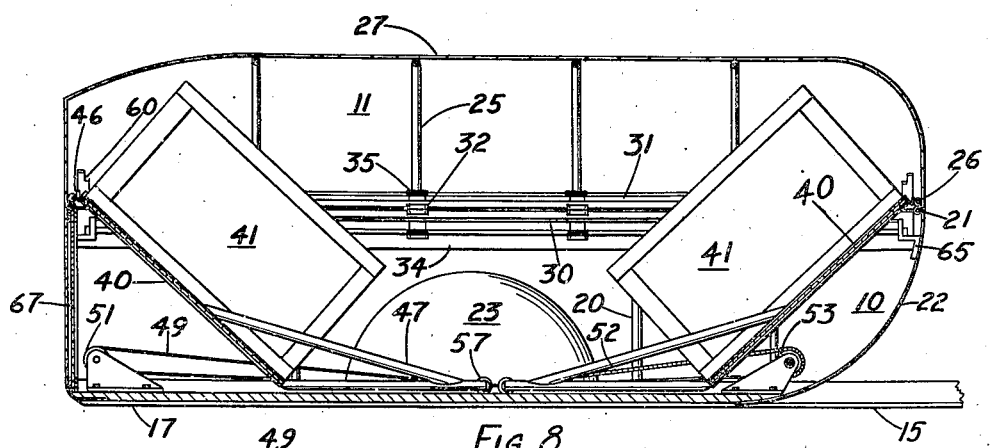
Figure 9:
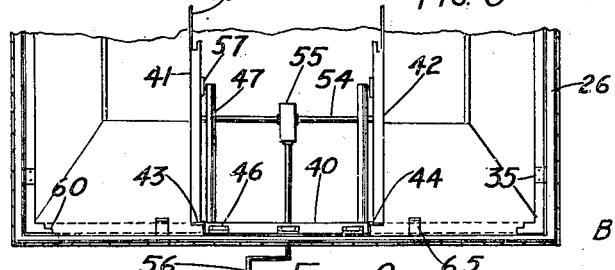

In the drawings Fig. 1 is a side elevation illustrating the trailer vehicle of the invention in the collapsed condition; Fig. 2 is a rear end view of the trailer vehicle shown in Fig. 1; Fig. 3 is a side elevation of the trailer vehicle shown in the upright condition; Fig. 4 is a rear end view of the vehicle as shown in Fig. 3; Fig. 5 is a cross sectional view of the trailer body taken along the line 5—5 of Fig. 3; Fig. 6 is a cross sectional view of the trailer body taken along the line 6—6 of Fig. 1; Fig. 7 is a longitudinal cross sectional view taken along the line 7—7 of Fig. 5; Fig. 8 is a longitudinal sectional view taken along the line 8—8 of Fig. 6; Fig. 9 is a fragmentary sectional view taken along line 9—9 of Fig. 7, but illustrating the end wall portions in a folded condition.

Referring now to Figs. 1 to 4 of the drawings the trailer vehicle comprises a rigid base section 10 and a rigid roof section 11 of generally boxlike configuration which in the collapsed condition of the trailer fit cooperatively together around adjacent edges to form a relatively low compact unit. Panel side wall sections 12 and end wall sections 13 are hingedly secured between the upper and lower edges respectively of the base and roof sections 10 and 11 which in the raised position support the roof section 11 in an elevated condition illustrated in Figs. 3 and 4. The base section 10 may be provided with any suitable running gear 14 and towing yoke 15.

Referring now to Figs. 5 to 8, the base section 10 comprises a pair of longitudinal T-shaped iron sills 17 and 18 extending the length of the vehicle body and supporting the floor 19 therebetween. Outwardly curved tubular members 20, welded at their lower ends to the members 17 and 18, extend upwardly therefrom and are rigidly united across their upper ends by means of horizontally extending tubular member 21. Suitable sheeting 22, such as metal or plywood, is secured to the outer surface of the tubular frame members 17—21 to define the outer surface of the base section. Wheel wells 23 are provided centrally of the base section on each of the opposite sides thereof for accommodating the wheels of the running gear.

The roof section 11 comprises a tubular framework including transverse bows 25 welded at their lower ends to horizontally extending tubular member 26, the framework being covered with a suitable sheeting 27. The lower peripheral edge of the roof section is recessed as indicated at 28 so that in the lowered position of the roof it will engage snugly and cooperatively over the tubular member 21 extending around the upper edge of the base section to effect a substantially watertight seal therewith.

The opposite side walls comprise lower and upper rigid panelled portions 30 and 31 which are hinged together as indicated at 32, the lower portion 30 being further hinged along its lower edge to a longitudinally extending member 34 secured to the frame members 18 of the base section while the upper side wall portions are hinged as at 35 to the lower edge of the roof section. The side walls are adapted to fold inwardly in an accordion-like manner as illustrated more clearly in the cross sectional view of Fig. 6. In the collapsed or folded position the wall portions 30 and 31 extend substantially horizontally so as to overlie bunks or other furnishings (not shown) provided along each of the opposite sides of the base section.

Referring to Fig. 5, the opposite end walls each comprise a central panel section 40 and opposite wing panel sections 41 and 42, the wing sections 41 and 42 being hinged as at 43 and 44 respectively to the longitudinal edges of the central section 40 for inward folding movement as shown in Fig. 9. The uppermost ends of the central sections 40 of each of the opposite end walls are hingedly secured as at 46 to the lower edge portions of the roof section 11. A pair of tubular bracket arms 47 are secured to opposite sides of each central end wall section 40 which bracket arms extend downwardly and inwardly of the base section toward each other as illustrated more clearly in the view of Fig. 7. The lower extremities of the bracket arms 47 are fastened to corresponding ones of a pair of cables 49 extending longitudinally of the base section. At the rear end of the trailer, as viewed in Fig. 7, the cables extend over pulleys 51 while at the forward end each cable includes a length of chain 52 which is trained over sprockets 53. The sprockets 53 are rigidly mounted upon a shaft 54 extending transversely of the base section. As shown in Fig. 9, a worm gear unit 55 is mounted on shaft 54 which unit is connected to a crank 56 arranged on the outside of the forward end of the base unit 10 whereby raising and lowering movements of the roof section may be controlled.

It will be observed that the cable 49 is crossed between the pulley 51 and the sprocket 53 and the lowermost ends of the bracket arms 47 are secured to opposite sides of the cable so that rotation of the sprockets 53 in the counterclockwise direction, as viewed in Fig. 7, will cause the lower extremities of the bracket arms 47 to be actuated toward each other for effecting lowering of the roof. In the raised position of the roof section as viewed in Fig. 7 the lower extremities of the bracket arms 47 will be lifted above the floor 19 but as the roof section is lowered the ends of the bracket arms will engage with the floor and rollers 57 are provided on the ends of the bracket arms to permit free rolling of the arm ends over the floor.

Referring to Fig. 9 it will be observed that the side walls are provided at opposite ends with inturned flange portions 60 defining shoulders acting as stops for the end wall wing sections 41 and 42 in their unfolded position. In this manner a weathertight seal may be effected between the side and end walls while at the same time the side walls are rigidly braced in their straightened condition. Any suitable latching means (not shown) may be provided for securing the wing sections 41 and 42 to the adjacent side wall portions 60. It is to be understood, of course, that the roof section will be stably supported by the central end wall sections 40 alone in the event that it may be desired to fold open the wing sections 41 and 42 as for ventilation in hot weather.

To permit lowering of the roof section to the position illustrated in Fig. 8, the end wing sections 41 and 42 of the end walls are first folded inwardly toward each other, as shown in Fig. 9, in which condition they may be suitably latched by means not shown to the brackets 47 and as the lower ends of the bracket arms are then moved toward each other the roof may be lowered by means of crank 56. It may be necessary to initiate inward folding movement of the opposite side walls by pushing the hinged joint 32 slightly past center, following which they will automatically fold inwardly as the roof is lowered to the position illustrated in Figs. 6 and 8.

As illustrated in Fig. 6, the height of the upper and lower side wall sections 30 and 31 is such that in the completely folded condition an aisle is provided therebetween of a width sufficient to accommodate the folded end wall units. To support the side wall sections in the folded condition as illustrated in Fig. 6 a pair of suitable brackets 65 are provided on each of the opposite end walls of the base section. It is to be understood, however, that the folded side walls may be equally well supported by other means such as benches, bunks or tables which would ordinarily be built into the base section along opposite sides of the center aisle.

Access to the trailer when in the upright condition may be obtained through a door provided in the rear end. As illustrated more clearly in the rear end views of Figs. 2 and 4 a lower door section 67 is provided in the rear end wall of the base section 10 and an upper door section 68 is provided in the central panel section of the foldable end wall. These two door sections 67 and 68 are hinged on the same side and may be suitably interconnected for simultaneous opening and closing.

Having described the present invention in what is considered to be a preferred embodiment thereof it is desired that it be understood that the specific details shown are merely illustrative and that the invention may be carried out by other means.

What I claim is:

1. A trailer comprising cooperating boxlike base and roof sections, side wall sections hingedly secured along their lower and upper edges to corresponding edge portions of said base and roof sections, said side wall sections being hinged intermediate the upper and lower edges thereof parallel with said upper and lower edges for inward folding movement, end wall sections hingedly mounted adjacent their upper ends to the forward and rear ends of said roof section, the lower ends of said end wall sections being movable inwardly toward each other in said base section for permitting lowering of said roof section, and means operatively connected to the lowermost ends of said end wall sections for forcing said lower ends apart and raising of said roof section relative to said base section.

2. A trailer comprising a base section and a roof section, inwardly foldable side walls hingedly secured along the lower and upper edges to corresponding edges of said base and roof sections, opposite end walls each comprising a central section and opposite side wing sections, said wing sections being hingedly secured to said central section for folding movement toward each other, the upper end of said central section being hingedly connected to said roof section, and operating means connected to the lower end of said central section for effecting raising and lowering movements of said roof section.

3. A trailer comprising base and roof sections, end wall units mounted in each of the opposite ends of said trailer, said end wall units including central and side wing sections, the uppermost end of said central section being hingedly connected to the lower edge portion of said roof section, said side wing sections being hinged to each of the opposite sides of said central section, said wing sections being foldable inwardly of said trailer toward each other, bracket arms secured to the lower end of said central section, cable means extending longitudinally of said trailer and mounted in said base section, said cable means being connected to said arms, and operating means operatively connected to said cable means whereby raising and lowering movements of said roof section may be effected.

4. A trailer comprising boxlike base and roof sections, side wall units hingedly mounted upon the upper and lower edge portions respectively of said base and roof sections, said side wall units being hinged intermediate their lower and upper edges for inward folding movement, end wall units comprising central and opposite side wing sections, each of said central sections being hinged at its upper edge to the adjacent lower edge of the corresponding end of said roof section, said side wing sections being foldable toward each other inwardly of said trailer, and means secured to the lower ends of said central sections for effecting raising and lowering movements of said roof section, the space between the adjacent edges of said side wall units in the folded condition being somewhat greater than the width of said central end wall section.

5. A trailer comprising base and roof sections, end wall units hingedly connected to the lower edge portions of said roof section at each of the opposite ends thereof, the lower end portions of said end wall units being movable inwardly of said trailer toward each other, an endless cable connected to the lower ends of each of said end wall units, rotatable members at front and rear of said base section about which said cable passes, each flight of said cable being connected to one only of said end wall units whereby movement of said cable causes opposed movement of the lower ends of said end wall sections, and manually operatable driving means connected to said cable through one of said rotatable members for effecting raising and lowering movements of said roof section.

HAROLD C. BRUMBAUGH.

REFERENCES CITED

The following references are of record in the file of this patent:

UNITED STATES PATENTS

| Number | Name | Date |
| --- | --- | --- |
| 1,386,943 | Moore | Aug. 9, 1921 |
| 1,863,206 | Quinn | June 14, 1932 |
| 1,917,824 | Burns | July 11, 1933 |
| 2,076,486 | Watt | Apr. 6, 1937 |
| 2,182,967 | Kors | Dec. 12, 1939 |

FOREIGN PATENTS

| Number | Country | Date |
| --- | --- | --- |
| 100,293 | Australia | Feb. 12, 1937 |